Sept. 13, 1932.   J. W. FITZ GERALD   1,876,894
AUTOMOTIVE VEHICLE HOOD LOCK
Filed Oct. 9, 1929   2 Sheets-Sheet 1
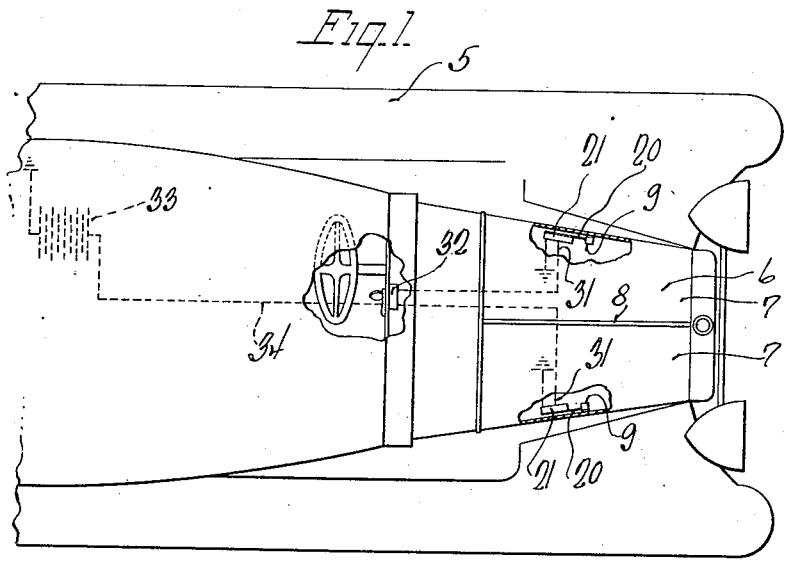
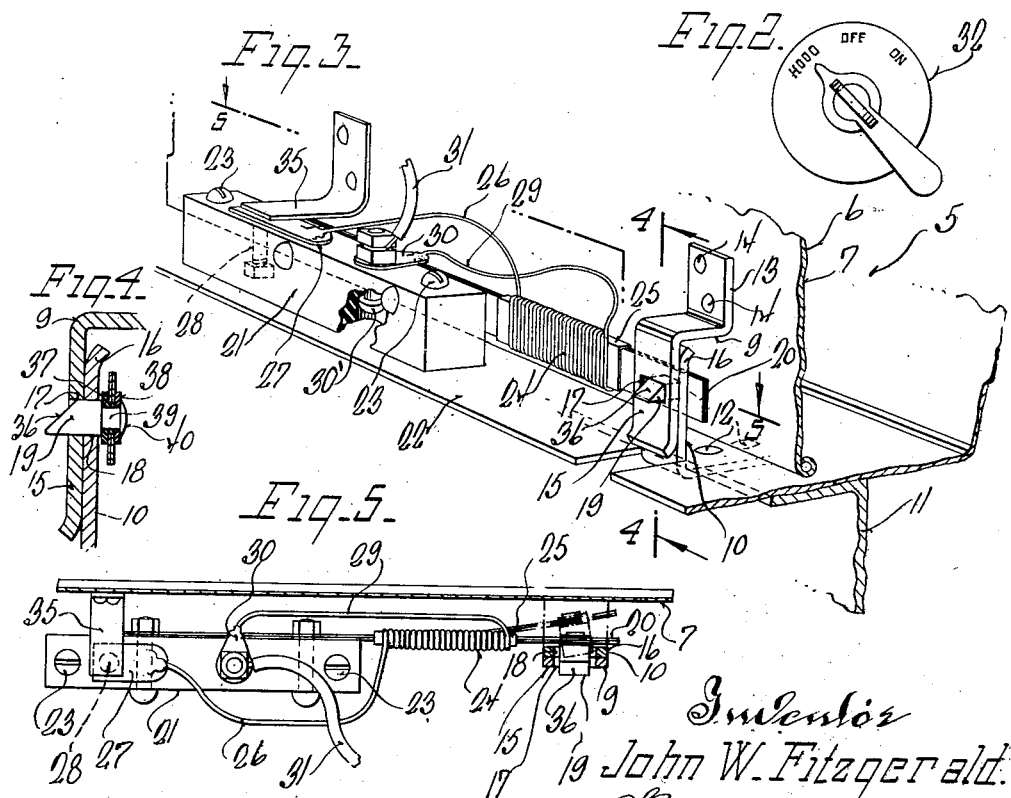
Inventor
John W. Fitzgerald
By Ira Milton Jones
Attorney

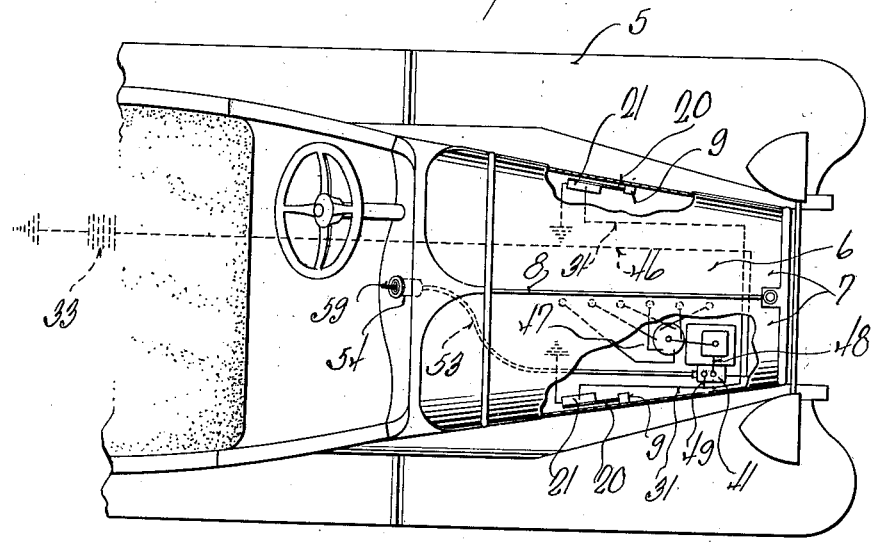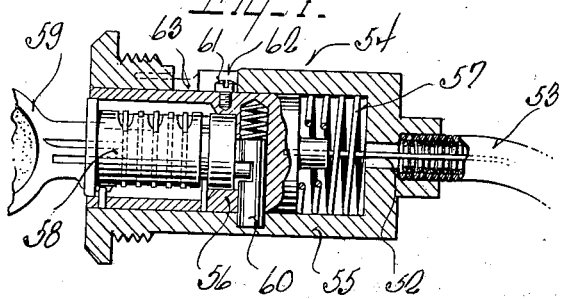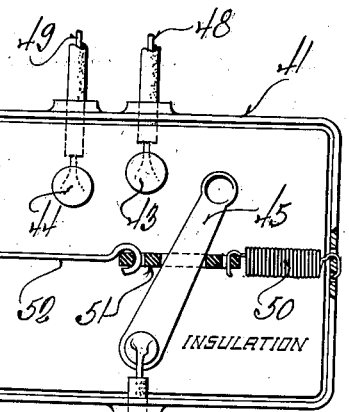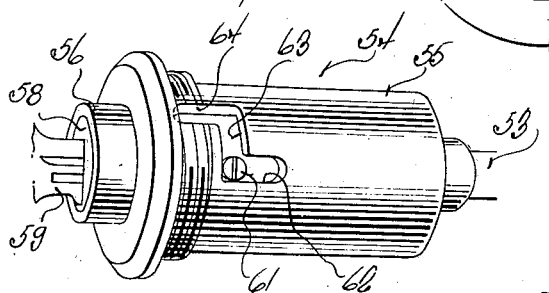

Patented Sept. 13, 1932

1,876,894

UNITED STATES PATENT OFFICE

JOHN W. FITZ GERALD, OF MILWAUKEE, WISCONSIN, ASSIGNOR TO BRIGGS & STRATTON CORPORATION, OF MILWAUKEE, WISCONSIN, A CORPORATION OF DELAWARE

AUTOMOTIVE VEHICLE HOOD LOCK

Application filed October 9, 1929. Serial No. 398,435.

This invention relates to certain new and useful improvements in locking devices for automotive vehicle hoods.

Numerous methods have been devised to protect parked automobiles against theft, but to provide a reasonable degree of effectiveness they usually required an armored cable, to enclose and protect the wires leading from the dash to the ignition coil. This is objectionable both from the standpoint of cost and dependability.

The only method by which the use of such armored cable can be obviated is to lock the hood against unauthorized opening, but the means heretofore devised for this purpose were cumbersome and ineffective, and required the inconvenient manual actuation of a lock or its equivalent located at the hood.

It is therefore, an object of the present invention to provide an automatic locking device for the hood of an automotive vehicle.

Another object of this invention resides in the provision of a locking device of the character described, controlled by a thermal element.

Another object of this invention resides in the provision of a novel means for locking an automotive vehicle hood which may be actuated to release the hood by merely closing a switch located at a convenient point.

A further object of this invention resides in the provision of means whereby a locking device of the character described may be operated to release the hood upon closing of a circuit, the circuit being broken upon opening the hood.

And a more specific object of this invention resides in the provision of a locking device of the character described which utilizes as its active element a strip of bimetallic metal.

It is also an object of this invention to increase the effectiveness of an automobile locking system by locating the ignition switch and the switch controlling the opening of the hood, within the engine compartment, both switches being controllable from the dash.

And another object of this invention resides in the provision of means whereby the ignition switch is utilized to effect the release of the hood.

With the above and other objects in view which will appear as the description proceeds, my invention resides in the novel construction, combination and arrangement of parts substantially as hereinafter described and more particularly defined by the appended claims, it being understood that such changes in the precise embodiment of the hereindisclosed invention may be made as come within the scope of the claims.

In the accompanying drawings, I have illustrated two complete examples of the physical embodiment of my invention constructed according to the best modes I have so far devised for the practical application of the principles thereof, and in which:

Figure 1 is a fragmentary top plan view with portions broken away of an automotive vehicle equipped with my improved hood locking device;

Figure 2 is a detail view of the switch controlling the ignition circuit and the circuit of the locking device;

Figure 3 is a fragmentary perspective view of the locking device per se;

Figure 4 is a cross sectional view taken through Figure 3 on the plane of the line 4—4;

Figure 5 is a sectional view taken through Figure 3 on the plane of the line 5—5;

Figure 6 is a view similar to Figure 1 illustrating a slightly modified manner of effecting the release of the hood locking device;

Figure 7 is a transverse sectional view of the switch lock employed;

Figure 8 is a view of the switch with the cover removed; and

Figure 9 is a top view of the lock in its ignition circuit closing position.

Referring now more particularly to the accompanying drawings in which like numerals designate like parts throughout the several views, the numeral 5 represents a conventional automotive vehicle having a hood 6 which consists of two sections 7 hingedly connected and mounted as at 8. The sections 7 are automatically secured against unauthorized opening by pairs of members 9 and 10, carried by the hood sections 7 and each side of the chassis frame 11 of the vehicle, respectively, and adapted to be engaged with each other when the hood sections are closed, and as the locking devices of the two hood sections are identical in construction, the following description will be in the singular.

The members 9 and 10 are both preferably formed of strips of metal bent to substantially right angles. The horizontal leg of the member 10 is riveted or otherwise secured to the adjacent upper flange of the chassis side 11, as at 12, and the member 9 has an attaching flange 13 extended therefrom which is secured to the adjacent portion of the hood section 7 by rivets 14 or the like. The vertical portions 15 and 16 of the latch members 9 and 10 respectively, have their outer ends directed oppositely to facilitate their snug engagement upon closing of the hood section, and are provided with apertures 17 and 18 respectively which are aligned when the hood section is fully closed, to receive a latch 19. The latch 19, in passing through the aligned apertures 17 and 18, restrains relative movement between the members 9 and 10 and secures the hood section in its closed position.

To permit authorized opening of the hood sections, the latch 19 is mounted upon the outer free end of a bimetallic strip 20 fixed at its opposite end to a block of insulating material 21, which is secured to an adjacent portion 22, of the vehicle, by bolts 23 or the like. The bi-metallic strip 20 is preferably positioned between the member 10 and the adjacent portion of the hood section 7 to, when in normal position, maintain the latch 19 in engagement with the apertures 17 and 18 to lock the hood section as hereinbefore stated, and when effected by heat, in a manner to be later described, disengage the latch 19 from the aperture 17 by flexing to its dotted line position illustrated in Figure 5, which thus frees the hood section for opening.

The means for heating the bi-metallic strip 20 consists of a coil of resistance wire 24 wound about the medial portion of the strip, but insulated therefrom by a layer of mica 25 or the like. One end 26 of the coil is soldered or otherwise secured to a terminal 27 fixed to the insulating block 21 by a bolt 28 and its other end 29 is soldered to a terminal 30 also fixed to the insulating block by a bolt 30'. From the terminal 30 a conductor 31 leads to a suitable switch 32 conveniently located on the dash of the vehicle and by which the coil 24 may be connected across the terminals of a battery 33.

The switch 32 may serve as the ignition switch or it may be one of the other usual switches about the vehicle. When the ignition switch is used it is provided with a third position as illustrated in Figure 2, at which the conductor 31 is connected with a conductor 34 leading to one side of the battery 33. As the ignition switch is usually controlled by a key it is readily obvious that only those persons authorized to unlock the hood and having the proper key in their possession may do so.

The end 29 of the heating coil 24 is thus connected with the one terminal of the battery 33 through the conductor 34, the switch 32, and the conductor 31, the return circuit from the other end 26 of the coil being through a contactor 35 carried by the hood section and adapted to engage the terminal 27 when the hood is closed to ground the same and thus complete the circuit to the other terminal of the battery which is also grounded.

Upon opening of the circuit of the coil 24, the bi-metallic strip 20 cools and again assumes its normal operative position projecting the latch 19 through the aperture 18. The upper outer surface of the latch is inclined as at 36 so that upon re-closing of the hood section and the re-engagement of its member 9 with the member 10, the latch 19 will be cammed outwardly by the leading edge of the member 9 until the aperture 17 is aligned with the aperture 18 when the inherent resiliency of the bi-metallic strip 20 will snap the latch 19 back to its operative position.

When it is desired to open the hood, it is only necessary to move the switch 32 to its proper position bridging the conductors 34 and 31, which connects the heating coil 24 with the battery. The heat developed by passage of the current through the coil causes the bi-metallic strip 20 to flex to its dotted line position illustrated in Figure 5, disengaging the latch from the aperture 17 and thus freeing the hood section for opening. As soon as the hood section is opened the contactor 35 disengages the terminal 27 and breaks the continuity of the coil circuit irrespective of the position of the switch 32, thus preventing the unnecessary discharge of the battery current.

To guard against dissipation of heat from the bi-metallic strip 20 through the latch 19 and the members 9 and 10, the latch 19 is insulated from the bi-metallic strip 20 by a suitable heat insulating material in the form of a bushing 37 and a washer 38 through which the reduced end 39 of the latch extends to be riveted over as at 40.

In Figures 6 to 9 inclusive, a slightly modified manner of effecting the release of the hood sections is illustrated. This method greatly increases the effectiveness of an automobile locking system for in this instance, both the ignition switch and the switch controlling the release of the hood sections are mounted within the engine compartment.

Both switches are preferably combined and mounted within a single housing 41. An insulating base 42 is positioned in the housing to mount stationary contacts 43 and 44 which are engageable by a movable switch arm or contactor 45 to complete the ignition circuit or the circuit of the heating coils 24.

The movable contactor 45 is connected with the battery 33 through a conductor 46; the stationary contact 43 is connected with the ignition circuit of the automobile indicated generally by the numeral 47, through a contactor 48; and the contact 44 is connected with the leads 31 extended from the terminals 30 of the heating coils 24, by a conductor 49.

Normally the movable contactor 45 is in its position illustrated in Figure 8, i. e., disengaged from both contacts 43 and 44, in which position it is held by a contractile spring 50 having one end connected with a portion of the housing 41 and its other end connected with an actuating member 51 formed of insulating material and apertured to receive the contactor 45. The other end of the actuator has one end of a wire 52 connected with it, which leads from the housing 41 through a flexible armored cable 53 to a switch lock 54 mounted on the dash of the automobile, and limits the action of the spring 50.

The lock structure 54 includes an outer casing 55 in which the mounting head 56 of a cylinder lock is longitudinally slidably mounted, being normally urged outwardly of the casing 55 by an expansive spring 57 confined between the inner end of the mounting head and the bottom of the casing bore. The mounting head has the adjacent end of the wire 52 secured to it and as the spring 57 is considerably stronger than the spring 50, it follows that whenever its energy is released the mounting head and consequently the contactor 45 will be moved.

As is customary, a lock cylinder 58 is received within the mounting head 56, which upon rotation imparted thereto by a key 59 moves a locking bolt 60 out of engagement with its recess in the casing 55 to release the energy of the spring 57.

The movement of the mounting head is guided and limited by a screw 61 threaded in the mounting head and movable in a longitudinal slot 62. The outer end of the slot 62 is so located that the movement of the mounting head and consequently that of the contactor 45 is arrested when the contactor is in alignment with and engages the contact 43 to close the ignition circuit.

From its outer end, the slot 62 is extended transversely as at 63 and then longitudinally as at 64 to provide for a second movement of the mounting head upon rotation thereof to move the screw head 61 through the transverse portion 63 and into alignment with the longitudinal portion 64. The second longitudinal movement of the mounting head carries the contactor 45 away from the contact 43 and into engagement with the contact 44 to close the circuit of the heating coils 24, and thereby effect the release of the hood sections in the manner described in connection with the modification illustrated in Figures 1 to 5 inclusive.

Inasmuch as the locking bolt 60 is retained in its position within the periphery of the mounting head by the reason of the fact that its operative end is engaged with the inner peripheral wall of the casing 55, it is apparent that the lock cylinder 58 is held against relative rotation with respect to the mounting head. Turning force applied to the key 59 is thus imparted to the mounting head, which enables the operator to move the screw head into alignment with the longitudinal slot 64.

To return the lock structure and the switch, it is only necessary to push the mounting head into the casing and then turn the key to realign the screw head 61 with the slot 62. This closes the ignition circuit, and if it is desired to open the ignition circuit the mounting head is again pushed inwardly to align the locking bolt with its recess.

From the foregoing description taken in connection with the accompanying drawings, it will be readily apparent to those skilled in the art to which an invention of the character described appertains, that I provide novel means for securing the hood of an automotive vehicle closed against unauthorized opening, the release of which may be readily effected from the driver's compartment, by merely moving a switch, and which automatically locks itself upon reclosing of the hood.

It is also apparent that in the disclosure illustrated in Figures 6 to 9 inclusive, the ignition circuit, the means for disabling the ignition circuit which is its switch, and the switch for effecting the release of the hood sections are all enclosed within the engine compartment, which greatly increases the effectiveness of an automobile locking system.

What I claim as my invention is:

1. The combination with an automotive vehicle hood, of means for securing the same against opening including a member carried by the hood, a latch member engageable with said member upon closing of the hood, thermally responsive means directly carrying the latch member and thermal means for operating the thermally responsive means to move the latch member out of engagement with said hood carried member to release the hood for opening.

2. The combination with an automotive vehicle hood, of means for securing the same against opening and comprising a member carried by the hood, a latch member engageable with the member upon closing of the hood, a thermal element connected with the latch member and movable upon temperature changes thereat to control the position of the latch member, and means operable from a remote point for changing the temperature at the thermal element to cause it to move and carry the latch member out of engagement with the hood carried member to release the hood for opening.

3. The combination with an automotive vehicle having a hood section movable to and from closed position, of means for releasably securing the hood section against unauthorized opening, means for releasing said last mentioned means to permit the hood section to be opened, an electric circuit, means whereby the means for effecting the release of the hood section is controlled by the electric circuit, means for closing the electric circuit to effect the release of the hood section, and means whereby opening of the hood section opens the electric circuit.

4. The combination with an automotive vehicle having a hood section movable to and from closed position, of means for releasably securing the hood section against unauthorized opening, thermally controlled means for effecting the release of said last mentioned means to permit the hood section to be opened, an electric circuit controlling said thermal means, means for closing the circuit, and means whereby the circuit is opened upon opening of the hood section.

5. The combination with an automotive vehicle having a hood section movable to and from closed position, of means for releasably securing the hood section against unauthorized opening, including a latch member, a thermal element mounting the latch member and normally maintaining it in operative position, and means for applying heat to the thermal element to cause it to move the latch member to inoperative position.

6. The combination with an automotive vehicle having a hood section movable to and from closed position of means for releasably securing the hood section against unauthorized opening, including a latch member, a thermal element mounting the latch member and normally maintaining it in operative position, means for heating the thermal element to cause it to move and carry the latch member to inoperative position to release the hood section for opening, said last mentioned means being controllable from a remote point.

7. The combination with an automotive vehicle having a hood section movable to and from closed position, of means for releasably securing the hood section against unauthorized opening, including a latch member, means whereby the latch member automatically secures the hood section in closed position upon closing thereof, and thermal means movable to carry the latch member to inoperative position to release the hood section for opening.

8. The combination with an automotive vehicle having a hood section movable to and from closed position, of means for releasably securing the hood section against unauthorized opening, including a stationary member having an aperture, a hood carried member cooperating with the stationary member and having an aperture which aligns with said stationary member aperture when the hood section is closed, a latch member engageable in said apertures to secure the cooperating members against relative movement and prevent opening of the hood section, a thermal element carrying the latch member and normally maintaining it in said apertures, and means for heating the thermal element, the heat of the thermal element causing it to flex and carry the latch member out of engagement with the hood section carried member aperture releasing the hood section for opening.

9. The combination with an automotive vehicle having a hood section movable to and from closed position, of means for releasably securing the same against opening, including a hood section carried element, a latch member, thermally responsive means carrying the latch member and yieldably maintaining the same in a position engageable with the hood section carried element upon closing of the same, and thermal means for moving said thermally responsive member to move the latch member out of engagement with the hood section carried element and release the hood section for opening.

10. The combination with an automotive vehicle having a hood section movable to and from closed position, of means for releasably securing the hood section against unauthorized opening and including a hood section carried element, a latch member, a bi-metallic strip mounting the latch member from a stationary part of the vehicle and yieldably maintaining the same in a position engageable with the hood section carried element upon closing of the same, and means for heating said bi-metallic strip to cause the same to flex and move the latch member out of engagement with the hood section carried element to release the hood section for opening.

11. The combination with an automotive vehicle having a hood section movable to and from closed position of means for releasably securing the hood section against unauthorized opening, and including a member carried by the hood section, a cooperating stationary member, a latch member adapted to secure said cooperating members against relative movement, and a thermal element mounting the latch member and movable to carry the latch member to and from its position securing the cooperating members against relative movement upon temperature changes of a predetermined degree thereat.

12. The combination with an automotive vehicle having a hood section movable to and from closed position, of means for releasably securing the same against opening including a latch member engageable with an abutment carried by the hood section, thermally responsive means carring the latch member and yieldably maintaining the same in a position engaging said hood section carried abutment, and thermal means for moving said thermally responsive member to move the latch member out of engagement with the hood section carried abutment to release the hood section for opening.

In testimony whereof I have hereunto affixed my signature.

JOHN W. FITZ GERALD.